3,455,901
DRYING PROCESSES FOR LOW VISCOSITY CELLULOSE ESTERS
Carlton L. Crane, Rochester, N.Y., assignor to Eastman Kodak Company, Rochester, N.Y., a corporation of New Jersey
No Drawing. Filed May 29, 1967, Ser. No. 642,203
Int. Cl. C08b *3/22, 21/02;* C09j *3/04*
U.S. Cl. 260—230                                    5 Claims

ABSTRACT OF THE DISCLOSURE

Significantly faster drying of wet low viscosity cellulose esters can be accomplished by:

(a) subjecting the wet ester to temperatures above the melting point of the ester under drying conditions until the wet ester forms a clear, brilliant melt, and then (b) chilling the melt quickly through the temperature range of from the melting point of the ester to about 40° C. below the melting point.

This quick chilling results in better products than those resulting from slowly cooling the molten materials.

---

The present invention relates to special processes for drying low viscosity cellulose esters such as, for example, low viscosity cellulose butyrates.

In general, the lower the viscosity of a specific cellulose ester the lower is the melting point of the product and the greater is the water susceptibility and the tendency to be softened or become gummy and sticky in the presence of water or water vapor. This property presents special problems in drying these esters since temperatures much above 100° F. are high enough so that these low viscosity materials tend to coalesce. The usual drying methods such as tray driers, moving belts, or vacuum driers tend to transform these products into gummy layers covering and adhering to exposed metal surfaces. These layers have excellent insulating properties and as a result the drying times of these products are extended to lengths which make them uneconomical to manufacture. In addition, these layers of product trap moisture and even though the products are exposed to heat for extended periods of time the moisture content is reduced very slowly. Typical drying time for conventionally drying solid, particulated low viscosity cellulose esters is 24 to 48 hours or more.

It has now been discovered that the total drying time for such ordinarily difficult to dry materials can be drastically reduced (to as little as 15–30 minutes, or sometimes even less) if the low viscosity cellulose ester is:

(a) subjected to drying conditions at a temperature above its melting point until said cellulose ester forms a clear "melt," and (b) then chilled quickly through the temperature range of from about the melting point of the dried ester to that temperature at which the "melt" regains the characteristics of a solid. (Generally about 40° C. below its melting point.)

If all of these elements are not carefully followed, all of the benefits that can be obtained by practicing this invention simply cannot be obtained. For example, in the case of low viscosity cellulose butyrates, if the dried "melt" is permitted to cool through the critical temperature range under ordinary ambient conditions (rather than via the quick chilling of the present invention), the resulting cooled, solidified product is only party soluble in toluene (one of the solvents most widely used in high quality lacquers), whereas the identical material that has been dried in accordance with the above critical elements, surprisingly, is completely soluble in toluene, forming clear solutions in toluene at all levels up to as high as 30% or more. Similar improved properties are exhibited by other low viscosity cellulose esters when they are dried via the processes of this invention.

The term "low viscosity" or "low melting" cellulose esters is well known in the art to signify those cellulose esters having intrinsic viscosities (measured in 9:1 methylene chloride-methanol within the range of from about 0.01 to about 0.6). As pointed out above, it is these materials that cause the basic drying problem that has been solved by the present invention. The problem generally doesn't exist with respect to the higher viscosity cellulose esters. Typical, non-limiting examples of cellulose esters that can be treated successfully via the processes of this invention are "low viscosity" cellulose acetate, the cellulose butyrates, cellulose propionate, cellulose crotonate, cellulose acetate butyrate, cellulose isobutyrate propionate, cellulose acetate phthalate, cellulose acetate propionate, and the like. Mixtures of these materials, and the materials themselves that are either in a relatively pure condition or contain conventional stabilizers, anti-oxidants, plasticizers, dyes, pigments, and the like can be treated in accordance with the present processes. Similarly, the degree of substitution of the low viscosity cellulose esters of this invention can vary over a very wide range; for example, from about 0.3 to 3, although, generally, those within the range of from about 1.5 to 3 will be preferred.

The temperatures to which the melted "low viscosity" cellulose esters are subjected in accordance with the present processes can be varied within fairly wide ranges, depending upon such factors as whether or not the esters have been stabilized against heat degradation, the inherent stability of the ester itself, the amount of color that can be present in an acceptable dried product the maximum amount of physical degradation of the ester desired, and the like. Generally, better results are obtained when the temperature of the "melt" is held to within about 30° C. of the melting point of the ester during the period in which it is subjected to drying conditions, although temperatures as high as 100° C., or more, above the melting point of the ester (or the highest melting point if a mixture of esters is dried) during the drying step of the present processes.

The "chilling" step of the present processes requires a high degree of control in the successful practice thereof. It is preferably undertaken as soon as practicable (if a minimum of color in the product is desired) after the "melt" has been dried to the desired extent, (i.e., preferably to a moisture level of about 0.5% or less). During this "chilling" step, it is essential that the temperature of the cellulose ester be lowered through the critical temperature range (which varies from ester to ester, but is from just below the melting point of the ester to about 40° C. below such melting point. When mixtures of esters are "chilled," the lowest melting point of the mixture is utilized as the higher temperature of this critical range. Additional cooling of these products after they have been quickly cooled through the critical range can then be undertaken in any of a number of ways without effecting the products adversely. Similarly, the particular way the necessary "chilling" is accomplished is not critical insofar as the successful practice of this invention is concerned. Thus, the hot dried products can be dropped, in their initial "melt" condition, onto a bed of Dry Ice, or a cooled steel sheet, or even through a stream of cold gas, so long as the physical contact with the particular chilling medium is sufficient to lower the temperature of the hot dried ester through the critical temperature region within a period of at most about 3 minutes (preferably within about 30 seconds for optimum results). In addition, the "chilling" step should be undertaken wherever possible under substantially anhydrous conditions or under conditions such that the solidified product is left with no more than the maximum moisture level required for an acceptably dried product. Thus, although it is preferred that the "chilling" step be performed under fairly anhydrous conditions, water (preferably cool) can be sprayed over a thin layer (or a thin strand) of dried, molten cellulose ester to effectively lower the temperature of the ester through the critical temperature region within the necessary short period of time. In this way, however, only enough water should be used to solidify the product; the residual heat in the cellulose ester then being enough to evaporate any liquid water remaining on the ester, to thereby obtain the desired, dried, cellulose ester product.

Table I below lists typical "critical temperature ranges" for typical "low viscosity" cellulose esters. It is intended to serve only as a guide, since each "low viscosity" cellulose ester generally has a melting point that may or may not be the same as that in Table I.

Table I

| Ex. | Cellulose ester | Intrinsic viscosity | Percent OH | Melting point (° C.) | Critical temperature range (° C.) |
|---|---|---|---|---|---|
| 2 | Cellulose acetate | 0.27 | 2.1 | 215 | 215-175 |
| 3 | Cellulose acetate butyrate.[1] | 0.35 | 2.1 | 206 | 206-166 |
| 4 | Cellulose acetate phthalate.[2] | 0.53 | 1.65 | 195 | 195-155 |
| 5 | Cellulose butyrate | 0.27 | 2.1 | 154 | 154-114 |
| 6 | Cellulose propionate | 0.50 | 8.9 | 208 | 208-168 |
| 7 | Cellulose acetate propionate.[3] | 0.33 | 2.1 | 202 | 202-162 |
| 8 | Cellulose butyrate | 0.37 | 2.3 | 131 | 131-91 |

[1] 13.1% acetyl, 35.2% butyryl.
[2] 21.6% acetyl, 34.3% phthalyl.
[3] 2.2% acetyl, 45.7% propionyl.

Example

Conventional "low viscosity" cellulose butyrate (intrinsic viscosity at 25° C. in a 9:1 mixture of methylene chloride:methanol, 2.3% hydroxyl, 53.1% butyryl) containing 46 weight percent of water is treated as follows:

(A) One third is placed in a tray in a conventional commercial forced draft tray drier maintained at 80–90° F.
(B) One third is first stabilized with a small amount of p-t-butylphenol, and then placed on two trays in a conventional forced draft drying oven at 180° C.
(C) One third (unstabilized) is placed on two trays as in "B."

In each of these trays, the layer of ester is about ¼ inch thick. Sample "A" requires about 36 hours to dry (to a moisture content of 2.1 weight percent), whereas samples "B" and "C" form uniform clear brilliant "melts" (which were initially "cloudy") within 2 hours (having only 0.4% water at that point). One of the "C" trays and one of the "B" trays is then set onto a bed of Dry Ice and the surface of the melt covered with powdered Dry Ice. The temperature of the ester in these trays is practically immediately (within about 30 seconds) reduced to about 30° C. The resulting brittle cellulose ester (after being ground and screened to pass a U.S. Standard 100 mesh screen) forms clear, brilliant solutions in toluene at all levels up to about 30 weight percent of ester.

The second tray in each of samples "B" and "C" are set into a dessicator and allowed to cool under ambient conditions. In this way, more than 10 minutes are required for the temperature of these materials to pass from about 154° C. (the melting point of the cellulose butyrate sample) to about 114° C. After being ground and screened, the resulting dried product forms a two-phase solution in toluene that is not considered acceptable for use in the formulation of high quality lacquers in which toluene is the major solvent.

I claim:
1. A process for rapidly drying low viscosity cellulose esters having intrinsic viscosities in 9:1 methylene chloride:methanol of from about 0.1 to about 0.6, which process comprises initially subjecting a wet cellulose ester to drying conditions at a temperature above its melting point until said cellulose ester forms a clear melt and subsequently rapidly lowering the temperature of said ester through the temperature range of from the melting point of said cellulose ester to about 40° C. below said melting point.

2. A process as in claim 1, wherein the temperature of said cellulose ester is lowered through said temperature range within a period of at most about 3 minutes.

3. A process as in claim 1, wherein the temperature of said cellulose ester is lowered through said temperature range in less than 30 seconds.

4. A process as in claim 2, wherein said cellulose ester is cellulose butyrate.

5. A process for rapidly drying wet cellulose butyrate having an intrinsic viscosity in 9:1 methylene chloride: methanol of from about 0.01 to about 0.6, which process comprises:
  (a) heating said wet cellulose butyrate until its temperature is within the temperature range of from its melting point and about 30° C.;
  (b) maintaining the temperature of said molten cellulose butyrate withi nsaid temperature range under drying conditions until the water content of said molten cellulose butyrate is reduced to less than about 0.5 weight percent; and
  (c) subsequently chilling said molten cellulose butyrate to thereby quickly solidify said molten cellulose butyrate and reduce the temperature of the resulting dried, solid cellulose butyrate to below about 40° C.; the temperature of said cellulose butyrate being lowered through the temperature range of from about 154° C. to about 114° C. within about 30 seconds.

References Cited
UNITED STATES PATENTS
3,382,235  5/1968  Lillin _____ 260—230

HOSEA E. TAYLOR, Jr., Primary Examiner
R. W. MULCAHY, Assistant Examiner

U.S. Cl. X.R.
106—169